US008098887B2

(12) United States Patent
Inada

(10) Patent No.: US 8,098,887 B2
(45) Date of Patent: Jan. 17, 2012

(54) FACE TRACKING DEVICE

(75) Inventor: Junya Inada, Kariya (JP)

(73) Assignee: DENSO CORPORATION, Kariya (JP)

( * ) Notice: Subject to any disclaimer, the term of this patent is extended or adjusted under 35 U.S.C. 154(b) by 1015 days.

(21) Appl. No.: 12/010,340

(22) Filed: Jan. 24, 2008

(65) Prior Publication Data

US 2008/0317284 A1    Dec. 25, 2008

(30) Foreign Application Priority Data

Feb. 8, 2007 (JP) .................................. 2007-29314

(51) Int. Cl.
*G06K 9/62* (2006.01)

(52) U.S. Cl. ........ 382/103; 382/100; 382/106; 382/107; 382/118; 382/181; 701/70; 348/77; 345/588

(58) Field of Classification Search .......................... None
See application file for complete search history.

(56) References Cited

U.S. PATENT DOCUMENTS

| | | | | | |
|---|---|---|---|---|---|
| 5,859,921 | A | * | 1/1999 | Suzuki | 382/118 |
| 6,131,063 | A | * | 10/2000 | Seki et al. | 701/70 |
| 7,756,302 | B2 | * | 7/2010 | Matsuzaka et al. | 382/118 |
| 2004/0022416 | A1 | * | 2/2004 | Lemelson et al. | 382/104 |
| 2006/0045317 | A1 | * | 3/2006 | Adachi et al. | 382/118 |
| 2007/0160293 | A1 | * | 7/2007 | Ishikawa et al. | 382/181 |
| 2009/0147080 | A1 | * | 6/2009 | Inada | 348/77 |

FOREIGN PATENT DOCUMENTS

| | | |
|---|---|---|
| JP | A-11-281661 | 10/1999 |
| JP | A-2001-291108 | 10/2001 |
| JP | A-2004-130940 | 4/2004 |
| JP | A-2005-157648 | 6/2005 |
| JP | A-2005-182452 | 7/2005 |
| JP | A-2006-215743 | 8/2006 |
| JP | A-2006-350697 | 12/2006 |

OTHER PUBLICATIONS

Xiao et al., "Robust Full-Motion Recovery of Head by Dynamic Templates and Registration Techniques," Nov. 2004, International Journal of Computer Vision, vol. 60, pp. 135-164.*
Office Action dated Jan. 6, 2009 in corresponding JP application No. 2007-029314 (and English Translation).
I. Matthews and S. Baker, "Active Appearance Models Revisited," *International Journal of Computer Vision*, vol. 60, No. 2, Nov. 2004, pp. 135-164.
J. Xao et al., "Robust Full-Motion Recovery of Head by Dynamic Templates and Re-registration Techniques," *International Journal of Imaging Systems and Technology*, vol. 13, Sep. 2003, pp. 85-94.

* cited by examiner

*Primary Examiner* — John Lee
(74) *Attorney, Agent, or Firm* — Posz Law Group, PLC

(57) ABSTRACT

A face tracking device for tracking an orientation of a person's face with using a cylindrical head model, the face tracking device comprises: an image means for continuously shooting the person's face and for obtaining a first image data based on a shot of the person's face; an extraction means for extracting a second image data from the first image data, the second image data corresponding to a facial area of the person's face; a determination means for determining whether the second image is usable as an initial value required for the cylindrical head model; and a face orientation detection means for detecting the orientation of the person's face with using the cylindrical head model and with using the initial value determined to be usable by the determination means.

1 Claim, 8 Drawing Sheets

FACE TRACKING DEVICE

CROSS REFERENCE TO RELATED APPLICATION

The present application is based on Japanese Patent Application No. 2007-29314 filed on Feb. 8, 2007, the disclosure of which is incorporated herein by reference.

FIELD OF THE INVENTION

The present invention relates to a face tracking device that track an orientation of a person's face.

BACKGROUND OF THE INVENTION

Recently, a technique has been proposed for assisting a vehicle driver in accordance with his or her driving act with using a face tracking device mounted to a vehicle. The face tracking device tracks an orientation of a person's face based on image data of the person's face. In the above-described technique, the orientation of a vehicle driver's face is used as an informational item to assist the vehicle driver. An orientation of a person's face is referred to herein as a facial orientation.

An appearance model and a cylindrical head model are known methods for detecting the facial orientation based on an image data. A reference of the appearance model is, for example, given by I. Matthews and S. Baker, International Journal of Computer Vision, 2004, Vol. 60, No. 2, pp. 135-164. A reference of the cylindrical head model is, for example, given by J. Xaio et al., International Journal of Imaging Systems and Technology, 2003, Vol. 13, No. 2, pp. 85-94.

According to the appearance model, the facial orientation of a person is capable of being tracked when the facial orientation is between +10-degree and −10-degree around the vertical axis. The 0-degree angle of the facial orientation around the vertical axis corresponds to a case where the person faces front. When the vehicle driver is confirming safe conditions by looking right and left, an angle of the facial orientation may be changeable up to 60-degree or the like. Therefore, it is difficult to detect safety confirmation behavior done by the vehicle driver with using the appearance model.

According to the cylindrical head model, an orientation of a person's face is capable of being tracked even when the orientation angle is large.

However, a problem associated with the above-described cylindrical head model is that, unless frontal facial image data is manually set in advance, the cylindrical head model is not utilized.

SUMMARY OF THE INVENTION

In view of the above-described problem, it is an object of the present invention to provide a face tracking device and a method for tracking a person's face.

According to an first aspect of the present invention, a face tracking device for tracking an orientation of a person's face with using a cylindrical head model, the face tracking device comprises: a facial image obtaining unit that continuously obtains a person's face image as a first image data; a facial area extraction unit that extracts a second image data from the first image data, the second image data corresponding to a facial area of the person's face; an initial value determination unit that determines whether the second image is usable as an initial value required for the cylindrical head model; and a facial orientation tracking unit that detects the orientation of a person's face with using the cylindrical head model and with using the initial value determined to be usable by the initial value determination unit.

According to the above face tracking device, the determination means is capable of obtaining the initial value required for the cylindrical head model automatically. A convenient device is provided.

According to an second aspect of the present invention, a method for tracking an orientation of a person's face with using a cylindrical head model, the method comprises: obtaining a person's face image data as a first image data; extracting a second image data from the first image data, the second image data corresponding to a facial area of the person's face; determining whether the second image is usable as an initial value required for the cylindrical head model; and detecting the orientation of the person's face with using the cylindrical head model and with using the initial value determined to be usable.

According to the above method, the initial value required for the cylindrical head model is capable of being automatically obtained. A convenient method is provided.

According to a third aspect of the present invention, a face tracking device for tracking an orientation of a person's face with using a cylindrical head model, the face tracking device being mounted to a vehicle, the face tracking device comprises: a facial image obtaining unit which continuously obtains a person's face image data as a first image data; a facial area extraction unit which extracts a second image data from the first image data, the second image data corresponding to a facial area of the person's face; an initial value determination unit which calculates an first fitting error value of the second image data by performing fitting process of the second image data with using an appearance model, and which determines that the second image is usable as an initial value required for the cylindrical head model when all of the following conditions are satisfied: the first fitting error value is approximately smaller than a first predetermined error judgment value; a steering angle of the vehicle is approximately between −20 degree and +20 degree; a vehicle speed is approximately faster than 30 km/h; an acceleration of the vehicle is approximately larger than 0.03 G wherein a positive acceleration is provided by a case where the vehicle speed is being increased in the direction of vehicle movement; and a throttle angle of the vehicle is larger than 13%; and a facial orientation tracking unit which obtains the initial value determined to be usable by the initial value determination unit, processes the initial value by fitting calculation with using the cylindrical head model, calculates a second fitting error value from the initial value with using the cylindrical head model, and determines the orientation of a person's face when the second fitting error value is smaller than a second predetermined error judgment value.

According to the above face tracking device, the determination means is capable of obtaining the initial value required for the cylindrical head model automatically. A convenient device is provided.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
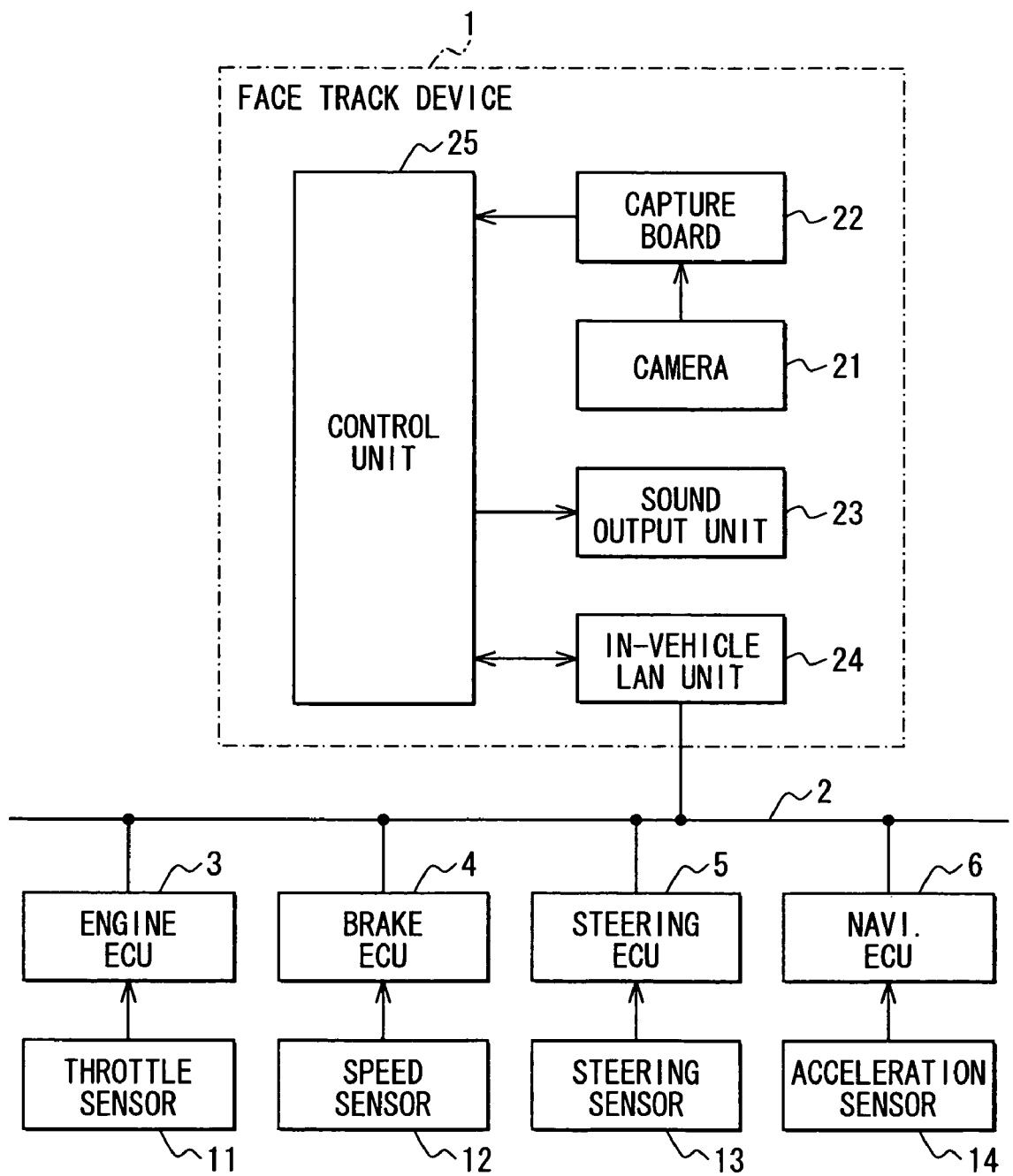
FIG. 1 is a block diagram illustrating a configuration of a face tracking device and a configuration of an in-vehicle LAN connected with the face tracking device.

As shown in FIG. 1, a face tracking device 1 mounted to a vehicle is coupled with an in-vehicle device and various electronic control units (ECUs) such as an engine ECU 3, a brake ECU 4, a steering ECU 5, a navigation ECU 6 and the like via an in-vehicle LAN (local area network) 2.

Among the various ECUs, the engine ECU 3 controls engine revolutions based on at least a detection signal from a throttle angle sensor 11. The throttle angle sensor 11 detects a throttle angle based on a position of an accelerator pedal.

Among the various ECUs, the brake ECU 4 performs an ABS (Anti-lock Brake System) control, a traction control and the like based on detection signals from a master cylinder pressure sensor (not shown in FIGS) and a vehicle speed sensor 12. The master cylinder pressure sensor detects a braking amount of a vehicle driver from oil pressure of the master cylinder that pumps brake oil in accordance with at least a position of a brake pedal.

The steering ECU 5 performs power steering control based on a detection signal from a steering angle sensor 13. The steering angle sensor 13 detects at least a front-wheel steering angle during the steering angle is being changed. The power steering control operation causes assistance power during the steering angle of a steering wheel is being changed.

The navigation ECU 6 performs a routing assistance, for example, from a present position to a destination position based on a detection signal from an acceleration sensor 14 and a GPS (global Positioning System) signal received with using a GPS antenna. The acceleration sensor 14 may detect an acceleration component, for example, parallel to line between vehicle front and rear.

Regarding the above-described ECUs 3-6 and the like, various informational items are arbitrarily transmitted and received via the in-vehicle LAN 2 mutually. The various informational items include information associated with the throttle angle, the vehicle speed and the like, which are obtained with using the ECUs 3-6.

The face tracking device 1 includes a camera 21, an image capture board 22, a sound output unit 23, an in-vehicle LAN communication unit 24 and control unit 25. The camera 21 shoots a driver's face continuously. The image capture board 22 temporally stores image data associated with an image shot by the camera 21. The sound output unit 23 outputs various voice guidance and the like. The in-vehicle LAN communication unit 24 communicates with other units, devices and the like through the in-vehicle LAN 2 by transmitting and receiving various informational associated with the vehicle. The control unit 25 performs various processings in accordance with input signals from the in-vehicle LAN communication unit 24 and the image capture board 22, and controls the sound output unit 23 and the in-vehicle LAN communication unit 24.

The control unit 25 includes a microcomputer having a central processing unit (CPU), a read-only memory (ROM), a random access memory (RAM), an I/O and a bus line for connection. The various processings performed by the control unit 25 may be based on a program stored in the ROM and the RAM.

Figure 2:
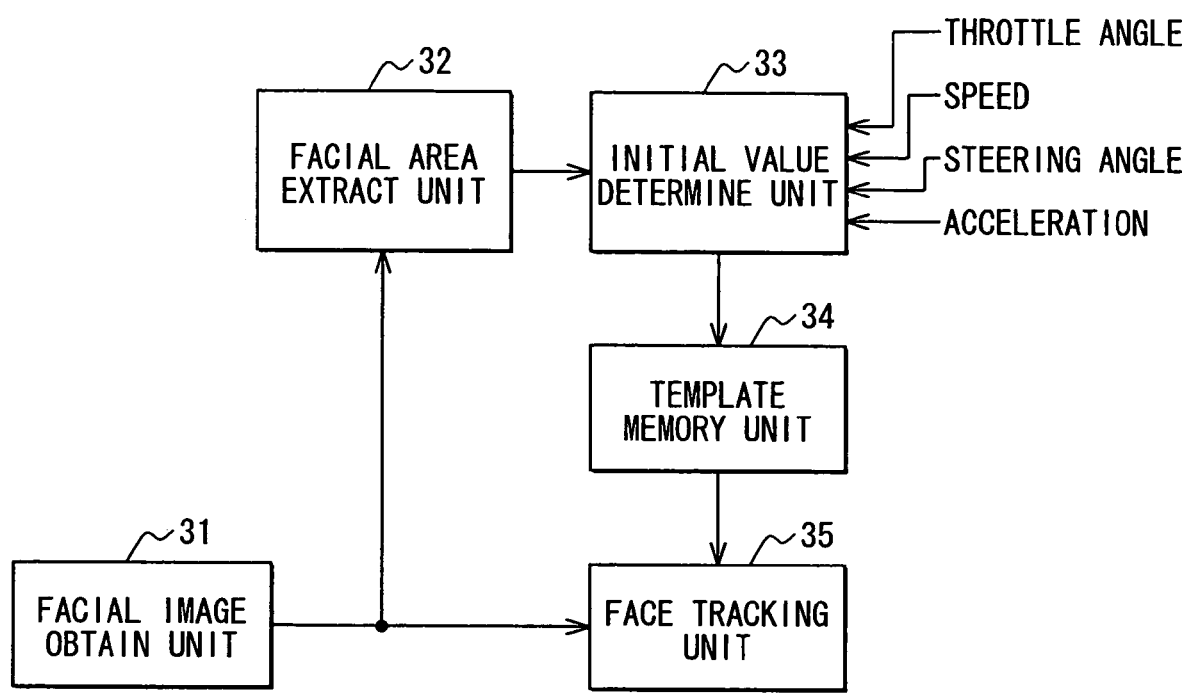
FIG. 2 is a functional block diagram for schematic explanation on an processing performed by a control unit.

As shown in FIG. 2, the control unit 25 includes a facial image obtaining unit 31, a facial area extraction unit 32, an initial value determination unit 33, a template memory unit 34, a facial orientation tracking unit 35. The facial image obtaining unit 31 obtains the image data temporally stored in the image capture board 22. The facial area extraction unit 32 extracts an area from the image data obtained by the facial image obtaining unit 31. The area to be extracted corresponds to a facial area in which the person's face is imaged. The initial value determination unit 33 determines whether the facial area in the image data is usable as an initial value required for a cylindrical head model with reference to various informational items. The informational items are associated with vehicle conditions such as the throttle angle, the vehicle speed, the steering angle, the acceleration and/or the like. The template memory unit 34 stores the image data determined to be usable as the initial data for the cylindrical head model as a template data. By exploiting the cylindrical head model with the template data, the facial orientation tracking unit 35 tracks an orientation of a person's face which is indicated by the image data, the image data being obtained by the facial image obtaining unit 31.

In the above-described face tracking device 1, the control unit 25 can perform both of an initial value obtaining process and a facial orientation tracking process independently. In the initial value obtaining process, the initial value for the cylindrical head model is obtained. In the facial orientation tracking process, an orientation of the person's face shot by the camera 21 is tracked.

Figure 3:
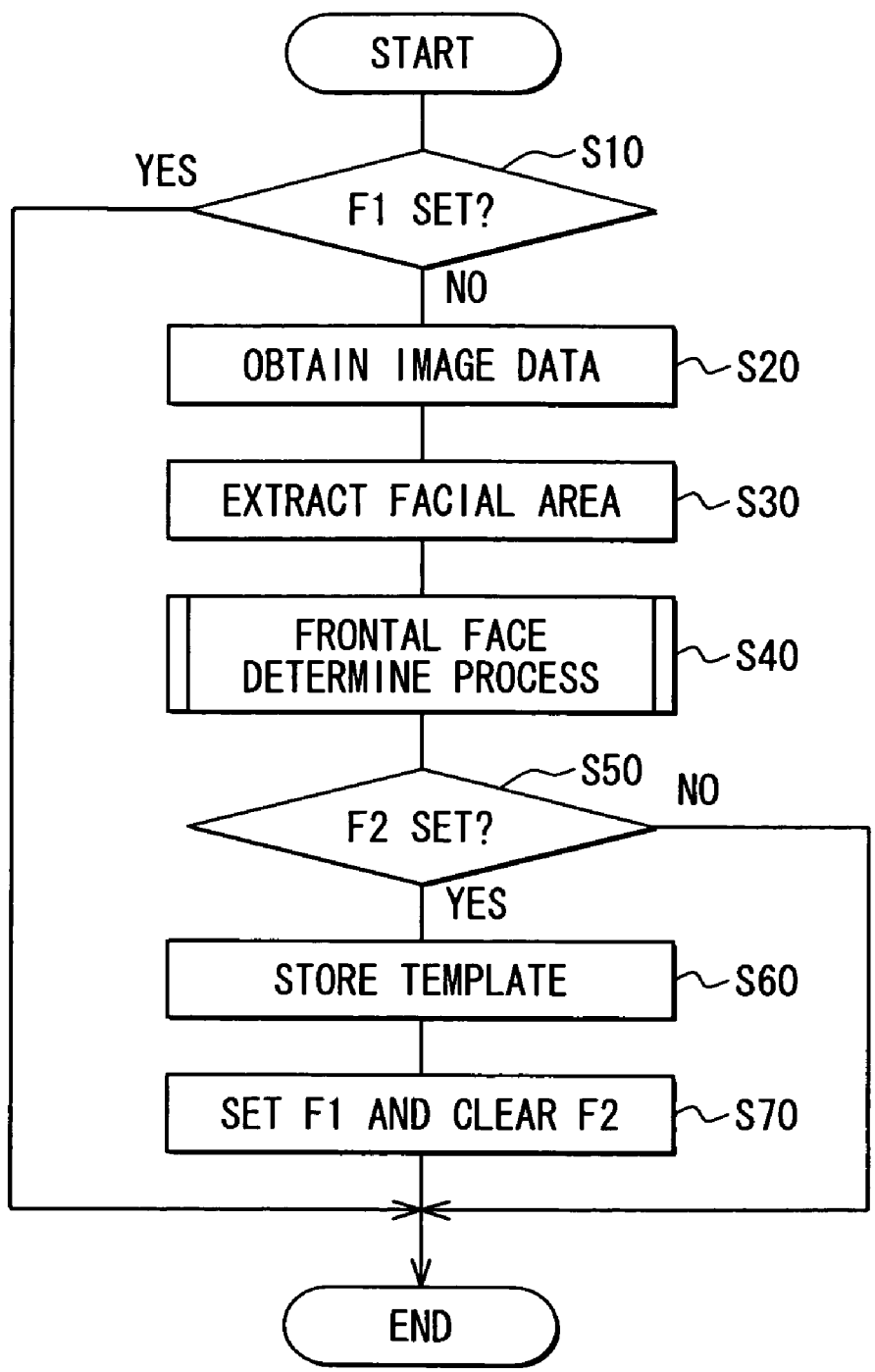
FIG. 3 is a flow chart for explanation on an initial value obtaining process.
Figure 4:
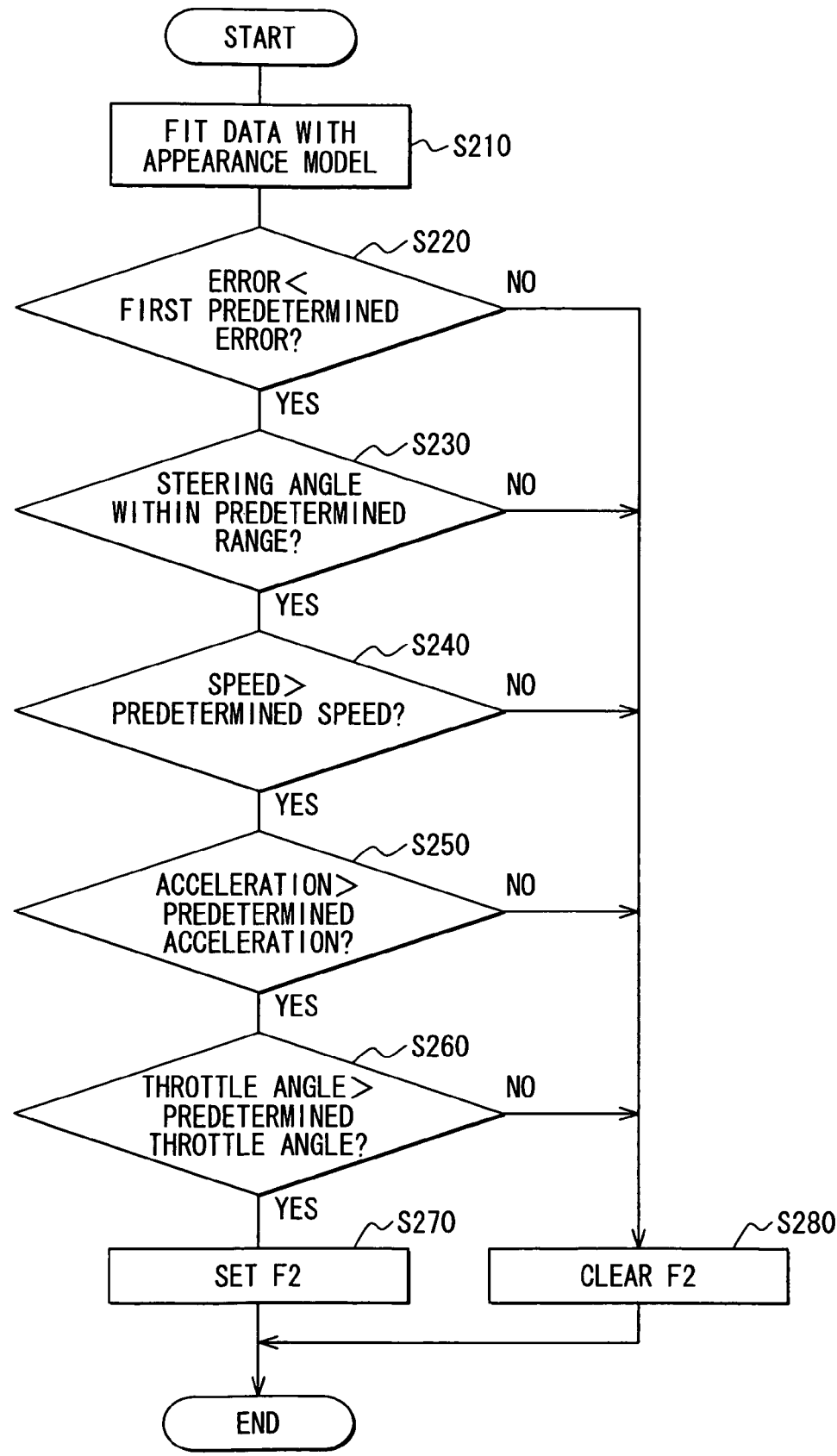
FIG. 4 is a flow chart for explanation on a frontal facial image determination process.

A processing flow of the initial value obtaining process performed by the control unit 25 of the face tracking device 1 is described below with reference to FIG. 3. FIG. 3 is a flow chart describing the initial value obtaining process. The initial value obtaining process is performed repeatedly during the control unit 25 is running, corresponding to a period of power-on.

In the initial value obtaining process, the control unit 25 determines at S10 whether an initial value obtained flag F1 is set. In other words, the control unit 25 determines whether the initial value for the cylindrical head model has been already obtained. The initial value obtained flag F1 are set and cleared at S70 and S460, respectively. When the initial value obtained flag F1 is set; the control unit determines that the initial value for the cylindrical head model has been already obtained, corresponding to "YES" at S10; and the control unit 25 stops the initial value obtaining process. When the initial value obtained flag F1 is not set, the control unit determines that the initial value for the cylindrical head model has not been obtained, corresponding to "NO" at S10. The control unit 25 obtains the image data from the image capture board 22 at S20.

Figure 6A:
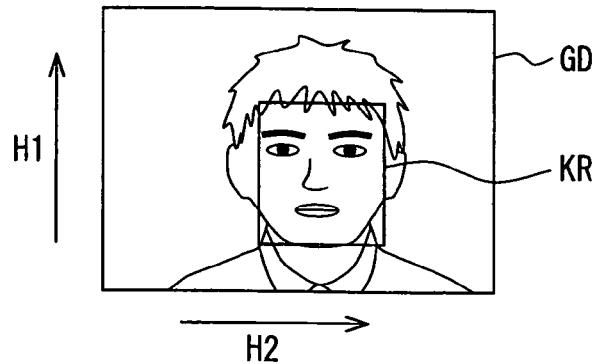
FIGS. 6A-6D are diagrams for explanation on processings at S30, S210, S60, and S430.

At S30, the control unit 25 extracts the facial area from the image data that is obtained at S20. More specifically, as shown in FIG. 6A, the control unit 25 extracts the facial area KR having a rectangular shape in such a manner: the control unit 25 calculates brightness of each pixel of the image data GD and brightness difference between two adjacent pixels; and the control unit 25 detects edges in the longitudinal direction H1 and in the lateral direction H2.

At S40, the control unit 25 performs a frontal face determination process in which a determination is made whether the person's face in the facial area KR of the image data GD faces front. In the frontal face determination process at S40, the control unit 25 also sets or clears a frontal face determination flag F2. When the person's face in the facial area KR faces front, the person's face in the facial area KR is called herein a frontal face.

At S50, the control unit 25 determines whether the frontal face determination flag F2 is set. In other words, a determination is made whether the person's face in the facial area KR faces front. When the frontal face determination flag F2 is not set; the control unit 25 determines that the person's face in the facial area KR does not face front, corresponding to "NO" at S50; and the control unit 25 stops the initial value obtaining process. When the frontal face determination flag F2 is set, the control unit 25 determines that the face in the facial area KR faces front, corresponding to "YES" at S50.

At S60: the facial area KR extracted from the image data GD, which is image data, is set as the initial value for the cylindrical head model; in addition, the control unit 25 processes the image data set as the initial value for the cylindrical head by data processing so that the image data fits a surface of a cylindrical object ET; further, the RAM of the control unit 25 stores the processed image data, which is attachable to the surface of the cylindrical object ET. The processed image data is used as a template for the cylindrical head model, and referred to herein as an initial value template.

At S70, the control unit 25 clears the frontal face determination flag F2 and sets the initial value obtained flag F1. The control unit 25 stops the initial value obtaining process.

When the frontal face determination process is performed, the control unit 25 performs the fitting processing of the facial area KR at S210, the facial area KR being obtained by extraction at S30.

Figure 7A:
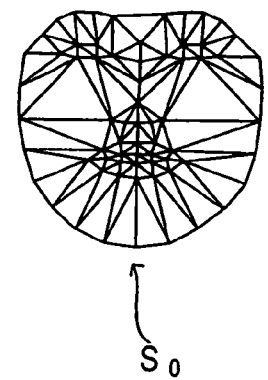
FIGS. 7A-7D are explanatory diagrams of a base shape and shape vectors.
Figure 7B:
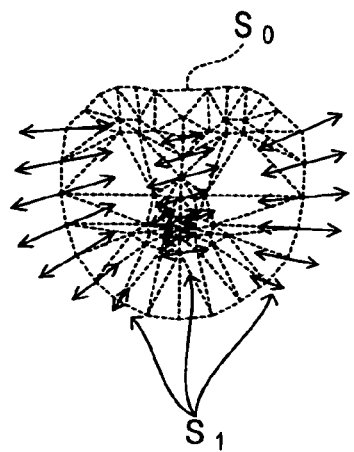
Figure 7C:
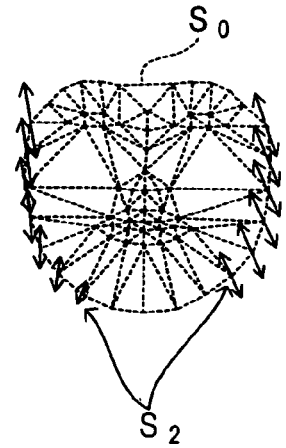
Figure 7D:
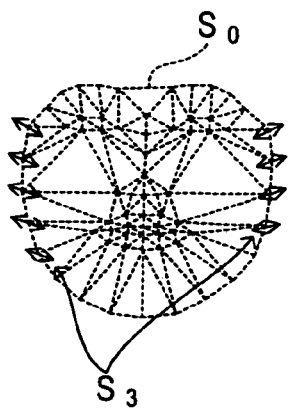

FIG. 7A illustrates a basis shape $s_0$. FIGS. 7B, 7C, 7D illustrate shape vectors $s_1$, $s_2$, $s_3$, respectively. In the FIGS. 7B, 7C, 7D, the vectors $s_1$, $s_2$, $s_3$ are illustrated over the basis shape $s_0$ in order to make clear initial points of the vectors.

An appearance model can express a figure of a person's face. In the appearance model, the basis shape $s_0$ and n shape vectors $s_i$ are preliminarily set. The basis shape $s_0$ includes information associated with a plurality of triangle-shaped meshes for expressing the frontal face (see FIG. 7A). The shape vectors $s_i$ are used for expressing the orientation of the person's face on the basis of the basis shape $s_0$. An expression of the figure of the person's face is given by calculation with using the basis shape $s_0$ and the n shape vectors $s_i$, and with using an equation described as $$s = s_0 + \sum_{i=1}^{n} p_i s_i, \qquad (1)$$

where $p_i$ are weights for each shape vector $s_i$, and i is counting number running from i=1 to i=n. Initial points of the vectors $s_i$ are disposed on apexes of the meshes. The vectors $s_i$ are set and disposed to all of the apexes of meshes. Note that only a part of the vectors $s_i$ relevant to corresponding part of the apexes of meshes are illustrated in the FIGS. 7B, 7C, 7D.

Furthermore, the appearance model can express color of the person's face. In the appearance model, a basis appearance image $A_0(x)$ of a frontal face and m appearance images $A_i(x)$ are preliminarily set. The basis appearance image $A_0(x)$ is used as a basis for expressing a person's frontal face. The appearance images $A_i(x)$ are used for a color fitting processing. The appearance images $A_i(x)$ are superimposed on the basis appearance image $A_0(x)$. An color expression of the person's face is given by calculation with using the basis appearance image $A_0(x)$ and the appearance images $A_i(x)$, and with using an equation described as $$A(x) = A_0(x) + \sum_{i=1}^{m} \lambda_i A_i(x), \qquad (2)$$

where x denotes a position in a region of the basis shape $S_0$ on two-dimension plane, $\lambda_i$ are weights for each appearance image $A_i(x)$, and i is counting number running from i=1 to i=m.

Figure 6B:
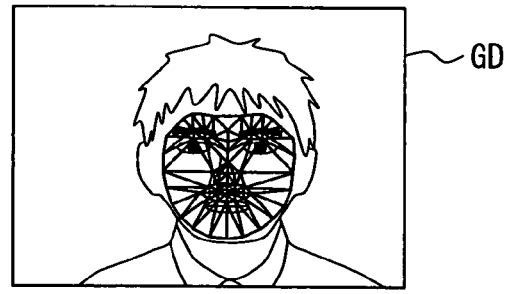
Figure 6C:
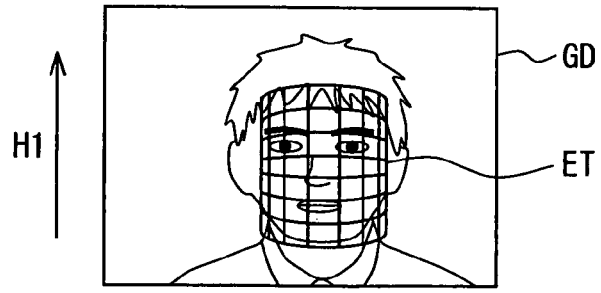
Figure 6D:
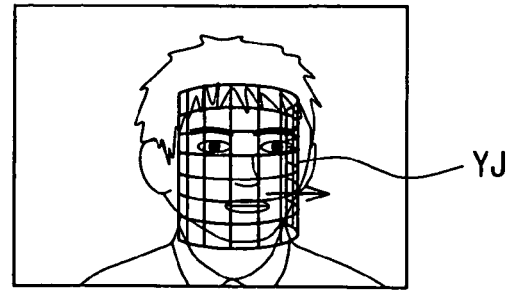

At S210, the control unit 25 performs a fitting processing by changing the superposition factors $p_i$, $\lambda_i$ so that an image resulting from calculation with using equations (1), (2) agrees with the image data GD obtained at S30 (see FIG. 6B). The control unit 25 calculates an error value that indicates degree of agreement between the image data GD and the image calculated with using equations (1), (2). The error value indicating difference in degree of agreement is also referred to herein as a facial image error value. The facial image error value is computed when the image from equations (1), (2) is in almost best agreement with the image data GD. Note that as the image data obtained at S20 is closer to the frontal face of the person's face, the facial image error value is smaller.

The ROM of the control unit 25 of the face tracking device 1 stores data associated with a plurality of basic shapes $s_0$, a plurality of shape vectors $s_i$, a plurality of basic appearance images $A_0(x)$, and a plurality of appearance images $A_i(x)$, which are set to be different in accordance with gender, age, race (e.g., physical features) and the like. The face tracking device 1 is configured such that each $s_0$, $s_i$, $A_0(x)$, $A_i(x)$ among a plurality of $s_0$, $s_i$, $A_0(x)$, $A_i(x)$ is selectable in accordance with driver's gender, age, race (e.g., physical features) and the like.

When S210 is finished, the control unit 25 determines at S220 whether the facial image error value calculated at S210 is smaller than a first predetermined error judgment value. More specifically, when the facial image error value is smaller than the first predetermined error judgment value, the control unit 25 determines that the person's face on the image data obtained at S20 faces front. When the facial image error value is larger than the first predetermined error judgment value, the control unit 25 determines that the person's face on the image data obtained at S20 does not face front. The first predetermined error judgment value is, for example, set to be 20 in the present embodiment.

When the facial image error value is larger than the first predetermined error judgment value: the control unit 25 determines that the person's face on the image data does not face front, corresponding to "NO" at S220; the frontal face determination flag F2 is cleared at S280; and the frontal face determination process is finished. When the facial image error value is smaller than the first predetermined error judgment value, the control unit 25 determines that the person's face on the image data faces front, corresponding to "YES" at S220.

The control unit 25 determines at S230 whether a steering angle is within a predetermined steering angle judgment range. In the present embodiment, the predetermined steering angle judgment range is, for example, between −20 degree and +20 degree.

When the steering angle is not within the predetermined steering angle judgment range, corresponding to "NO" at S230: the frontal face determination flag F2 is cleared at S280; and the frontal face determination process is stopped. When the steering angle is within the predetermined steering angle judgment range, corresponding to "YES" at S230, the control unit 25 determines at S240 whether a vehicle speed is faster than a predetermined vehicle speed judgment value. In the present embodiment, the predetermined vehicle speed judgment value is, for example, 30 km/h.

When the vehicle speed is slower than the predetermined vehicle speed judgment value, corresponding to "NO" at S240: the frontal face determination flag F2 is cleared at S280; and the frontal face determination process is stopped. When the vehicle speed is faster than the predetermined vehicle speed judgment value, the control unit determines at S250 whether an acceleration value is larger than a predetermined acceleration judgment value. In the present embodiment, the predetermined acceleration judgment value is approximately given as, for example, 0.03 G. A positive acceleration is provided by a case where the vehicle speed is being increased in the direction of vehicle movement due to, for example, the increase in the throttle angle.

When the acceleration value is smaller than the predetermined acceleration judgment value, corresponding to "NO" at S250, the frontal face determination flag F2 is cleared at S280. The frontal face determination process is stopped. When the acceleration is larger than the predetermined acceleration judgment value, corresponding to "YES" at S250, the control unit 25 determines at S260 whether a throttle angle is larger than a predetermined throttle angle judgment value. In the present embodiment, the predetermined throttle angle judgment value is, for example, 13%.

When the throttle angle is smaller than the predetermined throttle angle judgment value, corresponding to "NO" at S260, the frontal face determination flag F2 is cleared at S280. The frontal face determination process is stopped. When the throttle angle is larger than the predetermined throttle angle judgment value, corresponding to "YES" at S260: the frontal face determination flag F2 is set at S270; and the frontal face determination process is stopped.

Figure 8A:
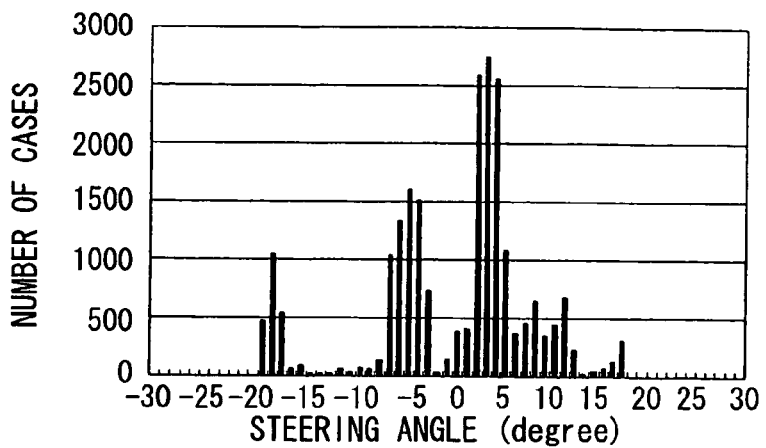
FIG. 8A is a graph illustrating steering angle distribution.

According to the present embodiment, the setting of the above-described predetermined steering angle judgment range is based on measurement of steering angles of multiple vehicles which run straight and in which drivers face front. Result of measurement is shown in FIG. 8A. FIG. 8A is a histogram illustrating distribution of the steering angles of the vehicles which run straight, and in which drivers face front. As shown in FIG. 8A, the steering angles of the vehicles, which run straight and in which drivers face front, are within a range between −19.6 degree and +18.1 degree. Note that a negative steering angle is measured in a case where a steering wheel is directed to left. For the above-described reason, the predetermined steering angle judgment range is set to be between −20 degree and +20 degree.

Figure 8B:
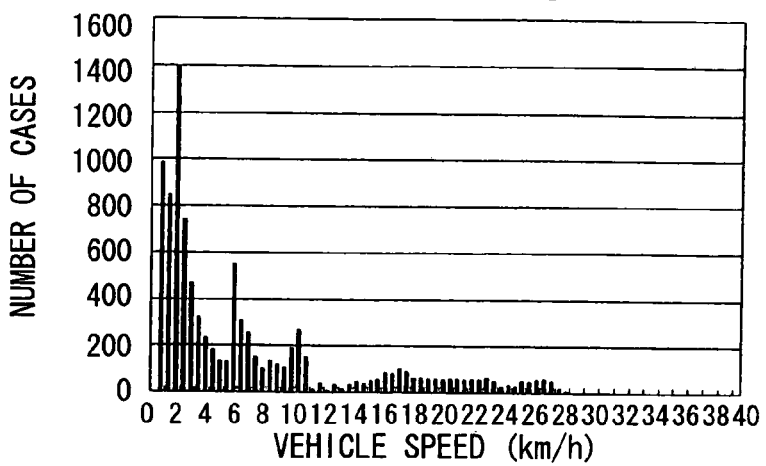
FIG. 8B is a graph illustrating vehicle speed distribution.

The setting of the above-described predetermined vehicle judgment value is based on measurement of speeds of multiple vehicles which are turning right or left. The reasons of the above-described measurement condition are that: a driver may look both sides when a vehicle stands; and it is unlikely that a driver faces front when a vehicle is turning right or left. Results of the measurement are shown in FIG. 8B. FIG. 8B is a histogram showing distribution of speeds of the vehicles while the vehicle are turning right or left. As shown in FIG. 8B, the vehicle speeds are in a range from 0 km/hr to 28.2 km/hr when the vehicles are turning right or left. For the above-described reason, the predetermined vehicle speed judgment value is set to be 30 km/h in the present embodiment. Note that the above-described measurements includes a case where a vehicle stands to give way to oncoming vehicles.

Figure 8C:
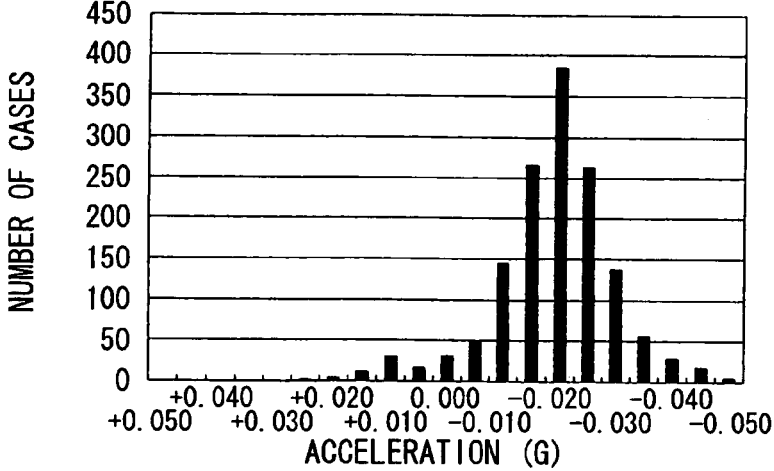
FIG. 8C is a graph illustrating acceleration distribution.

The setting of the above-described predetermined acceleration judgment value is based on measurement of acceleration values of multiple vehicles, the acceleration being parallel to the direction of vehicle movement. A positive acceleration is provided by a case where the speed of the vehicle is being increased in the direction of vehicle movement due to, for example, the increase in the throttle angle. Results of the measurement are shown in FIG. 8C. FIG. 8C is a histogram showing distribution of acceleration values in the direction of vehicle movement. In each measurement, a driver is confirming safety of surrounding environment. As shown in FIG. 8C, acceleration values are smaller than 0.028 G when the drivers are confirming safety of surrounding environment. It is expected that a driver looks fixedly forward during the driver accelerates a vehicle with the acceleration being larger than 0.03 G. For the above-described reason, the predetermined acceleration judgment value is set to be 0.03 G.

Figure 8D:
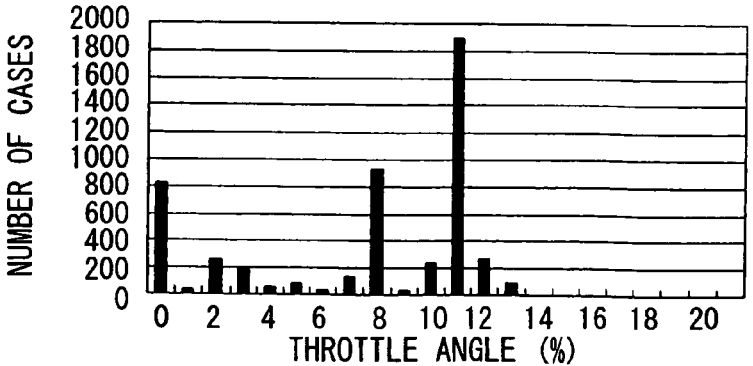
FIG. 8D is a graph illustrating throttle angle distribution.

The setting of the above-described predetermined throttle angle judgment value is based on measurement of throttle angles of multiple vehicles in each which a driver is confirming safety of surrounding environment. Results of the measurement are shown in FIG. 8D. FIG. 8D is a histogram showing distribution of throttle angles of vehicles in each which a driver is confirming safety of surrounding environment. As shown in FIG. 8D, throttle angles of vehicles are smaller than 12.2% when a driver is confirming safety of surrounding environment. It is expected that a driver looks fixedly forward during the driver accelerates the vehicle. For the above-described reason, the predetermined throttle angle judgment value is set to be 13%.

The measurement results shown in FIGS. 8A-8D are obtained such that: three drivers drive vehicles on both of an ordinary road and an express way; and each driver on both the ordinary road and the express way provides measured results; and the measured results provided by each driver are averaged.

Figure 5:
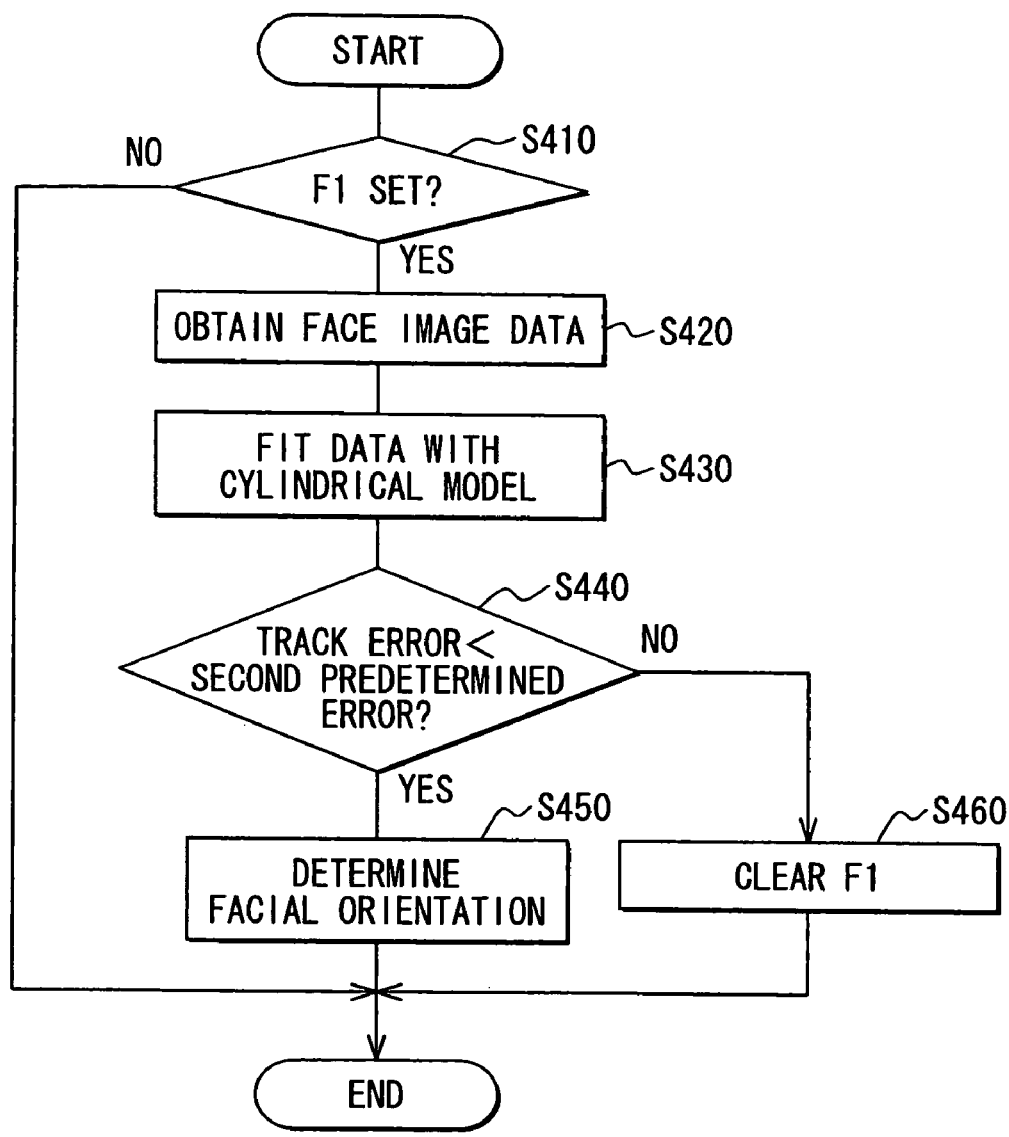
FIG. 5 is a flow chart for explanation on a facial orientation tracking process.

The control unit 25 of the face tracking device 1 performs the facial orientation tracking process. A processing flow of the facial orientation tracking process is described below with reference to FIG. 5. FIG. 5 is a flow chart describing the facial orientation tracking process. The facial orientation tracking process is performed repeatedly during the control unit 25 is running, corresponding to a period of power-on.

When the facial orientation tracking process is performed, the control unit 25 determines at S410 whether the initial value obtained flag F1, which is the flag set at S70 or cleared at S460, is set or not. In other word, the control unit 25 determines whether the initial value required for the cylindrical head model has been already obtained. When the initial value obtained flag F1 is not set: the control unit 25 determines that the initial value for the cylindrical head model has not been obtained, corresponding to "NO" at S410; and the facial orientation tracking process is stopped. On the other hand, when the initial value obtained flag F1 is set: the control unit 25 determines that the initial value for the cylindrical head model has been obtained, corresponding to "YES" at S410; and the control unit 25 obtains the image data from the image capture board 22 at S420.

At S430, with using the cylindrical head model, the control unit 25 performs a fitting processing on the image data obtained. More specifically, the fitting processing is described as follows: the control unit 25 performs a rotational calculation where a cylinder expressed with using the initial value template is rotated around various axes; every time a rotation angle is changed, a image data resulting from the calculation is compared to the image data obtained at S420; and a tracking error value is calculated, the tracking error value indicating degree of agreement between the image data resulting from the calculation and the image data obtained at S420. A rotation angle which gives the minimum tracking error value among calculated tracking error values indicates the orientation of the person's face (the facial orientation) in the image data obtained at S420. In the present embodiment, a roll angle $\theta_z$, a pitch angle $\theta_x$, and a yaw angle $\theta_y$ describe the rotation angle which is used for expressing the facial orientation.

At S440, the control unit 25 determines whether the tracking error value obtained from the fitting processing at S430 is smaller than a second predetermined error judgment value. In other words, the control unit 25 determines whether the fitting processing at S430 is successfully performed.

When the tracking error value obtained from the fitting processing at S430 is larger than the second predetermined error judgment value: the control unit 25 determines at S440 that the fitting processing at S430 is unsuccessfully performed, corresponding to "NO" at S440; the initial value obtained flag F1 is cleared; and the facial orientation tracking process is stopped. The processing from S20 to S70 are performed again for obtaining the initial value for the cylindrical head model.

When the tracking error value obtained from the fitting processing at S430 is smaller than the second predetermined error judgment value, the control unit 25 determines that the fitting calculation at S430 is successfully performed, corresponding to "YES" at S440. The control unit 25 determines at S450 that the rotation angle provided at S430 indicates a present orientation of the driver's face. The facial orientation tracking process is stopped for a while.

According to the face tracking device 1 having the above-described configuration, the camera 21 continuously shoots the driver's face, and provides image data. In addition, at S30, the facial area KR corresponding to a tracking object is extracted from the image data provided with using the camera 21. At S40 and at S210, the control unit 25 determines whether the person's face in the facial area KR corresponds to a frontal facial image. The image data of the facial area KR, which is determined to include the frontal facial image, is adopted as the initial value required for the cylindrical head model, and the orientation of the person's face is detected with using the cylindrical head model at S430.

According to the above-described face tracking device 1, the initial value required for the cylindrical head model is automatically obtainable. Therefore, an user procedure is capable of being skipped since it is not necessary for an user of the face tracking device 1 to manually provide an initial value associated with the cylindrical head model. According to the above-described advantage, it is possible to provide a device which is convenient for the user.

Since the processing at S210 is performed with using the appearance model, it is possible to make a determination of the frontal facial image with high dimensional accuracy. In the appearance model, the control unit 25 performs not only the fitting processing of the figure associated with the person's face with using the equation (1), but also performs the fitting processing on color of the person's face with using of the equation (2). Therefore, it is possible to make a determination of the frontal facial image with high accuracy, substantially independent from facial expression.

The determination of the frontal facial image is made with using signals from the throttle angle sensor 11, the vehicle speed sensor 12, the steering angle sensor 13 and the acceleration sensor 14, corresponding to the processings at S230-S260. In addition, the determination of the frontal facial image is made with using of the appearance model, corresponding to the processing at S210. Therefore, it is possible to make a determination of the frontal facial image with higher accuracy.

The determination of the frontal facial image is made with using the signals from the steering angle sensor, the vehicle speed sensor, the acceleration sensor, the throttle angle sensor and/or the like. In the above-described case, determinations are made: whether the steering angle is within the predetermined steering angle judgment range at S230; whether the vehicle speed is faster than the predetermined vehicle speed judgment value at S240; whether the acceleration value is larger than the predetermined judgment value at S250; and whether the throttle angle is larger than the predetermined throttle angle judgment value at S260. Therefore, a determination of the frontal facial image is made in a simple and convenient manner.

According to the present embodiment, the camera 21 is provided by an image means, the processing at S30 is provided by an extraction means, the processing at S40 is provided by a determination means, and the processing at S430 is provided by a face orientation detection means. In an alternative configuration: the initial value for the cylindrical head model may be different value; and the image means may provide a CCD (Charge Coupled Device Image Sensor), an image data receiving unit or the like.

According to the present embodiment, the control unit 25 determines the frontal facial image based on the processing at the S210 and the informational items from the steering angle sensor, the vehicle speed sensor, the acceleration sensor and the throttle angle sensor. Alternatively, the control unit 25 determines may determine the frontal facial image based on the processing performed at the S210 and information from at least one of or some of informational items from the above-described sensors. Alternatively the control unit 25 determines may determine the frontal facial image based on only the processing performed at the S210, without using any of the informational items from the above-described sensors.

According to the present embodiment, the rotation angle indicating the orientation of a person's face is described by roll, pitch and yaw angles. However, the rotation angle may be defined by another way. For example, the rotation angle may be described by three dimension vectors, Euler angles or the like.

According to the configuration of the present embodiment, $s_0$, $s_i$, $A_0(x)$, $A_i(x)$ are capable of being selected in accordance with a driver's gender, age, race (e.g., physical features) and/or the like. Alternatively, the selection may be made based on another informational item; a face tracking device may be configured such that the ROM of the control unit 25 may store an alternative informational item which can allow a user to use the face tracking device without selecting or depending on gender, age, race (e.g., physical features) and/or the like. A face tracking device may be also configured such that a user or driver can skip the procedure associated with the selection of $s_0$, $s_i$, $A_0(x)$, $A_i(x)$.

While the present invention has been described with reference to preferred embodiment thereof, it is to be understood that the present invention is not limited to the preferred embodiment and constructions. The present invention is intended to cover various modification and equivalent arrangements. In addition, while the various combinations and configurations, which are preferred, other combinations and configurations, including more, less or only a single element, are also within the spirit and scope of the present invention.

What is claimed is:

1. A face tracking device for tracking an orientation of a person's face with using a cylindrical head model, the face tracking device being mounted to a vehicle, the face tracking device comprising:
   image memory; and
   a processor, the processor configured to
      continuously obtain a person's face image data from the image memory as a first image data;
      extract a facial area by extracting a second image data from the first image data, the second image data corresponding to a facial area of the person's face;
      determine an initial value determination by calculating an first fitting error value of the second image data by performing fitting process of the second image data with using an appearance model, and determining that the second image is usable as an initial value required for the cylindrical head model when all of the following conditions are satisfied:
         the first fitting error value is approximately smaller than a first predetermined error judgment value;
         a steering angle of the vehicle is approximately between −20 degree and +20 degree;
         a vehicle speed is approximately faster than 30 km/h;
         an acceleration of the vehicle is approximately larger than 0.03 G wherein a positive acceleration is provided by a case where the vehicle speed is being increased in the direction of vehicle movement; and
         a throttle angle of the vehicle is approximately larger than 13%; and
      track a facial orientation by obtaining the initial value determined to be usable by the initial value determination unit, processing the initial value by fitting calculation with using the cylindrical head model, calculating a second fitting error value from the initial value with using the cylindrical head model, and determining the orientation of a person's face when the second fitting error value is smaller than a second predetermined error judgment value.

* * * * *